Patented June 30, 1925.

1,544,095

UNITED STATES PATENT OFFICE.

ARTHUR LÜTTRINGHAUS AND FILIP KAČER, OF MANNHEIM, GERMANY, ASSIGNORS TO BADISCHE ANILIN- & SODA-FABRIK, OF LUDWIGSHAFEN-ON-RHINE, GERMANY, A CORPORATION OF GERMANY.

MANUFACTURE OF VAT DYESTUFFS OF THE ANTHRAQUINONE SERIES.

No Drawing.  Application filed December 12, 1923. Serial No. 680,257.

*To all whom it may concern:*

Be it known that we, ARTHUR LÜTTRINGHAUS and FILIP KAČER, citizens of the German Empire, residing at Mannheim, Germany, have invented new and useful Improvements in the Manufacture of Vat Dyestuffs of the Anthraquinone Series, of which the following is a specification.

Vat dyestuffs of the anthraquinone series containing a thiazol nucleus have already been described.

The present invention relates to an improved process of manufacturing dyestuffs of the class mentioned which enables such products to be easily manufactured and with excellent yield and consists in condensing 1-mercapto-2-aminoanthraquinone of the formula

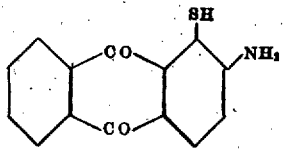

or a derivative of this compound, including by this term the disulfid corresponding to the mercapto compound, with a glyoxal body which expression comprises glyoxal itself or derivatives of it such as glyoxal bisulfite compounds, or glyoxal sulfite which latter can be readily obtained by the action of fuming sulfuric acid on symmetrical tetra-halogenethane.

With the 1-mercapto-2-amino-anthraquinone itself employed, the reaction is probably represented by the following structural formulae which, however, being a matter of theory, does not constitute part of this invention:

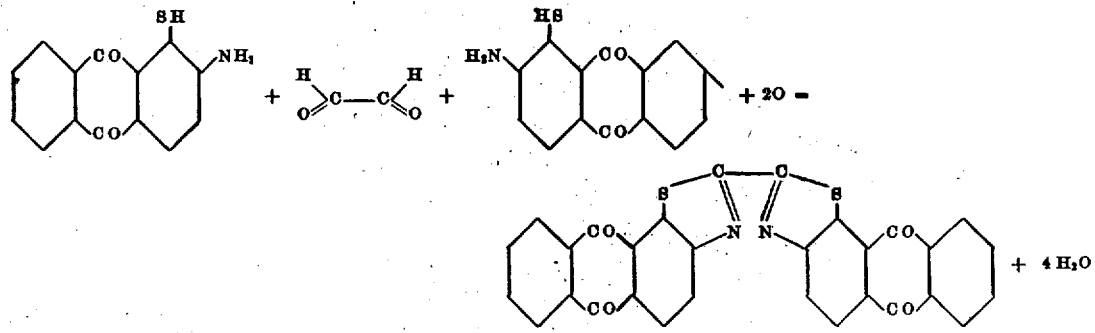

The process according to this invention is more fully described by the following example to which however the invention is not restricted. The parts are by weight.

10 parts of 1-mercapto-2-aminoanthraquinone or of the disulfid compound derived therefrom are dissolved in 100 parts of sulfuric acid of 66 degrees Baumé whereupon 4.7 parts of glyoxal sulfate are added. The mixture is then heated for about a quarter of an hour at between 90 degrees and 100 degrees centigrade, the color of the solution which at the beginning is greenish yellow turning thereby to yellowish red. When cool the mixture is introduced into water, the dyestuff filtered off and washed. It may be used for dyeing purposes directly or after further purification by boiling with sodium hypochlorite solution or by re-vatting. An advantageous method of working up consists in moderately diluting the reaction mixture with water or watery sulfuric acid, instead of pouring it into water, thus fractionally precipitating the coloring matter, which is then obtained by filtration. It dyes cotton yellowish shades with a distinct greenish hue.

What we claim is:

1. The process of producing vat dyestuffs of the anthraquinone series which consists in a 1-mercapto-2-aminoanthraquinone body with a glyoxal body.

2. The process of producing vat dyestuffs of the anthraquinone series which consists in condensing a 1-mercapto-2-aminoanthraquinone body with a glyoxal body in the presence of a solvent.

3. The process of producing vat dyestuffs of the anthraquinone series which consists in condensing in an acid medium a 1-mercapto-2-aminoanthraquinone body with glyoxal.

4. The process of producing vat dyestuffs of the anthraquinone series which consists in condensing in an acid medium a 1-mercapto-2-aminoanthraquinone body with a glyoxal body in the presence of a solvent.

In testimony whereof we have hereunto set our hands.

ARTHUR LÜTTRINGHAUS.
FILIP KAČER.

Witnesses:
WILHELM SCHERER,
ARTHUR DENONVILLE.

matter, which is then obtained by filtration It dyes cotton yellowish shades with a distinct greenish hue.

What we claim is:

1. The process of producing vat dyestuffs of the anthraquinone series which consists in a 1-mercapto-2-aminoanthraquinone body with a glyoxal body.

2. The process of producing vat dyestuffs of the anthraquinone series which consists in condensing a 1-mercapto-2-aminoanthraquinone body with a glyoxal body in the presence of a solvent.

3. The process of producing vat dyestuffs of the anthraquinone series which consists in condensing in an acid medium a 1-mercapto-2-aminoanthraquinone body with glyoxal.

4. The process of producing vat dyestuffs of the anthraquinone series which consists in condensing in an acid medium a 1-mercapto-2-aminoanthraquinone body with a glyoxal body in the presence of a solvent.

In testimony whereof we have hereunto set our hands.

ARTHUR LÜTTRINGHAUS.
FILIP KACER.

Witnesses:
WILHELM SCHERER,
ARTHUR DENONVILLE.

Certificate of Correction.

It is hereby certified that in Letters Patent No. 1,544,095, granted June 30, 1925, upon the application of Arthur Lüttringhaus and Filip Kačer, of Mannheim, Germany, for an improvement in " The Manufacture of Vat Dyestuffs of the Anthraquinone Series," an error appears in the printed specification requiring correction as follows: Page 2, line 7, claim 1, after the word " in " insert the word *condensing;* and that the said Letters Patent should be read with this correction therein that the same may conform to the record of the case in the Patent Office.

Signed and sealed this 21st day of July, A. D. 1925.

[SEAL.]

KARL FENNING,
*Acting Commissioner of Patents.*

Certificate of Correction.

It is hereby certified that in Letters Patent No. 1,544,095, granted June 30, 1925, upon the application of Arthur Lüttringhaus and Filip Kačer, of Mannheim, Germany, for an improvement in "The Manufacture of Vat Dyestuffs of the Anthraquinone Series," an error appears in the printed specification requiring correction as follows: Page 2, line 7, claim 1, after the word " in " insert the word *condensing;* and that the said Letters Patent should be read with this correction therein that the same may conform to the record of the case in the Patent Office.

Signed and sealed this 21st day of July, A. D. 1925.

[SEAL.] 
KARL FENNING,
*Acting Commissioner of Patents.*